United States Patent
Lu et al.

(10) Patent No.: US 8,458,151 B2
(45) Date of Patent: Jun. 4, 2013

(54) NETWORK DEVICE AND METHOD FOR UPDATING DATA OF THE NETWORK DEVICE

(75) Inventors: Yen-Chen Lu, Taipei Hsien (TW); Chih-Yuan Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 141 days.

(21) Appl. No.: 12/972,522

(22) Filed: Dec. 20, 2010

(65) Prior Publication Data
US 2012/0047118 A1     Feb. 23, 2012

(30) Foreign Application Priority Data
Aug. 20, 2010 (CN) .......................... 2010 1 0258670

(51) Int. Cl.
G06F 7/00         (2006.01)
G06F 17/00        (2006.01)

(52) U.S. Cl.
USPC .......................................................... 707/704

(58) Field of Classification Search
None
See application file for complete search history.

(56) References Cited

U.S. PATENT DOCUMENTS

| | | | |
|---|---|---|---|
| 2002/0095595 A1* | 7/2002 | Christopherson et al. | 713/200 |
| 2005/0228891 A1* | 10/2005 | Itoh et al. | 709/228 |
| 2006/0031476 A1* | 2/2006 | Mathes et al. | 709/224 |
| 2006/0253577 A1* | 11/2006 | Castaldelli et al. | 709/225 |
| 2009/0204692 A1* | 8/2009 | Smith et al. | 709/221 |

* cited by examiner

*Primary Examiner* — Uyen Le
(74) *Attorney, Agent, or Firm* — Altis Law Group, Inc.

(57) ABSTRACT

A network device and method for updating parameters of the network device provides an object adapting interface. The object adapting interface generates a service access interface and a configuration adapting interface. A management agent of the network device sends a requirement command. If the requirement command is a write command, the configuration adapting interface updates configuration parameters of the management agent stored in a configuration database of the network device. If the requirement command is a read command, the service access interface reads configuration parameters stored in the management agent.

9 Claims, 4 Drawing Sheets

NETWORK DEVICE AND METHOD FOR UPDATING DATA OF THE NETWORK DEVICE

BACKGROUND

1. Technical Field

Embodiments of the present disclosure relate to methods for data management of network devices, and more particularly, to a network device and a method for updating data of the network device.

2. Description of Related Art

A network device may include a management agent and at least a service agent. A configuration database (CDB) is required for storing configuration parameters of the service agent. If the configuration parameters need to be accessed, two methods are provided at present. The first method is for the management agent to call application interfaces of the service agent to access the configuration parameters. The management agent has to control communication with the service agent and the CDB. The second method is that each service agent should maintain its own configuration database. If the configuration parameters are modified, and the management agent or the service agent has not been updated in time, errors may occur to the network device.

DETAILED DESCRIPTION

The disclosure is illustrated by way of examples and not by way of limitation in the fingers of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
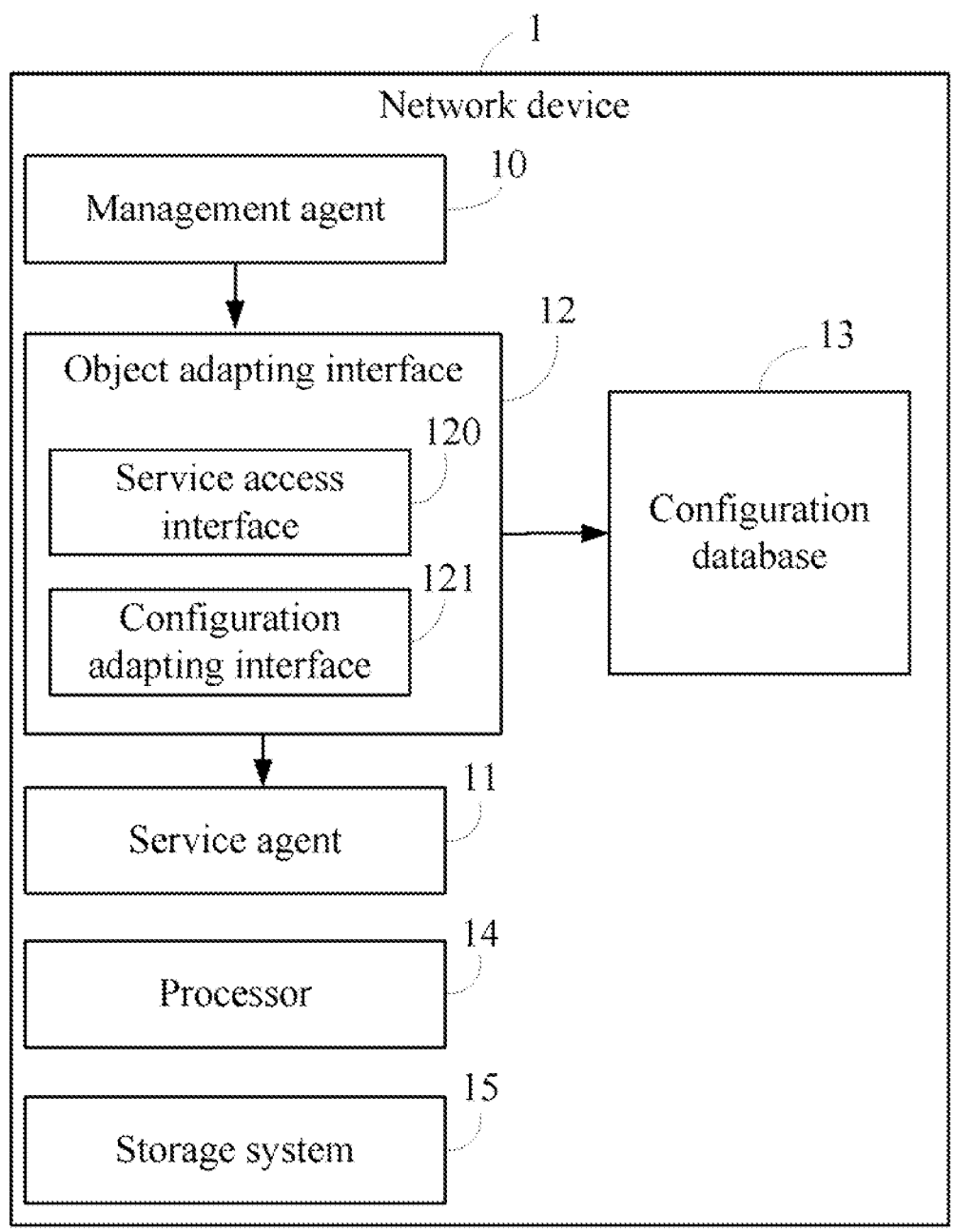
FIG. 1 is a block diagram of one embodiment of a network device.

FIG. 1 is a block diagram of one embodiment of a network device 1. In one embodiment, the network device 1 includes a management agent (MA) 10, a service agent (SA) 11, an object adapting interface 12, a configuration database (CDB) 13, a processor 14, and a storage system 15. A MA 10 is a software agent that runs on the network device 1 and provides an interface to manage the network device 1. The interface is provided for setting parameters of the network device 1. In one embodiment, the parameters may be firewall parameters. The MA 10 may be, for example, a MS DOS command prompt for inputting commands. The SA 12 is a software agent that runs on the network device 1 and receives parameters set on the MA 10. The SA 12 may be a firewall of the network device 1.

The object adapting interface 12 is an interface provided for the MA 10 to communicate with the SA 11 and the CBD 13. The CBD 13 stores a configuration file of the SA 11. The configuration file stores configuration parameters of the SA 11 set by a user. The configuration parameters are persistent data. In some embodiments, the configuration parameters may include a name, a data type, user authority of the SA 11. If the user has set the configuration parameters on the MA 10, the SA 11 generates a service access interface 120 and a configuration adapting interface 121 in the object adapting interface 12. The service access interface 120 and the configuration adapting interface 121 are software programs. The service access interface 120 accesses the SA 11 and reads data from the SA 11 or writes data to the SA 11. The configuration adapting interface 121 updates configuration parameters of SA 11 in the CBD 13.

The SA 11 also stores the configuration parameters of the SA 11. The configuration parameters stored in the SA 11 are non-persistent data.

Figure 2:
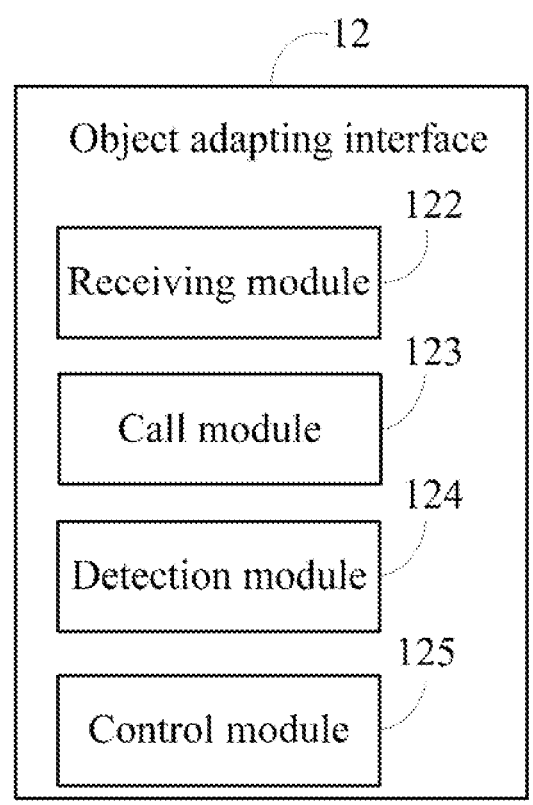
FIG. 2 is a block diagram of one embodiment of the object adapting interface in FIG. 1.

The object adapting interface 12 includes a number of function modules (illustrated in FIG. 2). The function modules may comprise computerized code in the form of one or more programs that are stored in the storage device 15. The computerized code includes instructions that are executed by the processor 14, to provide one or more aforementioned operations of the object adapting interface 12.

As shown in FIG. 2, the object adapting interface 12 may include a receiving module 122, a calling module 123, a detection module 124, and a control module 125.

The receiving module 122 receives a requirement command from the MA 10. The requirement command may be a read command or a write command including data to be written. In some embodiments, the requirement command may be to read configuration parameters of the SA 11 or to update the configuration parameters.

The calling module 123 calls the service access interface 120 and the configuration adapting interface 121.

The detection module 124 detects if the requirement command is a read command or a write command.

If the requirement command is a write command, the control module 125 controls the configuration adapting interface 121 to update the configuration parameters stored in the CBD 13 using the data included in the write command. In some embodiments, the configuration adapting interface 121 locks the CBD 13 and detects if the data included in the write command is persistent data. If the data is persistent data, the configuration adapting interface 121 updates the configuration parameters stored in the CBD 13 using the data. Then, the configuration adapting interface 121 unlocks the CBD 13. If the data included in the write command is non-persistent data, the configuration adapting interface 121 unlocks the CBD 13. In some embodiments, if the CBD 13 is locked, the user or some applications cannot access the CBD 13. If the locked CBD 13 is unlocked, the user and applications can access the CBD 13.

The control module 125 controls the service access interface 120 to access the configuration parameters stored in the SA 11 and executes the configuration parameters stored in the SA 11. In some embodiments, if the requirement command is the write command, the control module 125 controls the service access interface 121 to update the configuration parameters stored in the SA 11. If the requirement command is the read command, the control module 125 controls the service access interface 121 to read the configuration parameters stored in the SA 11.

Figure 3:
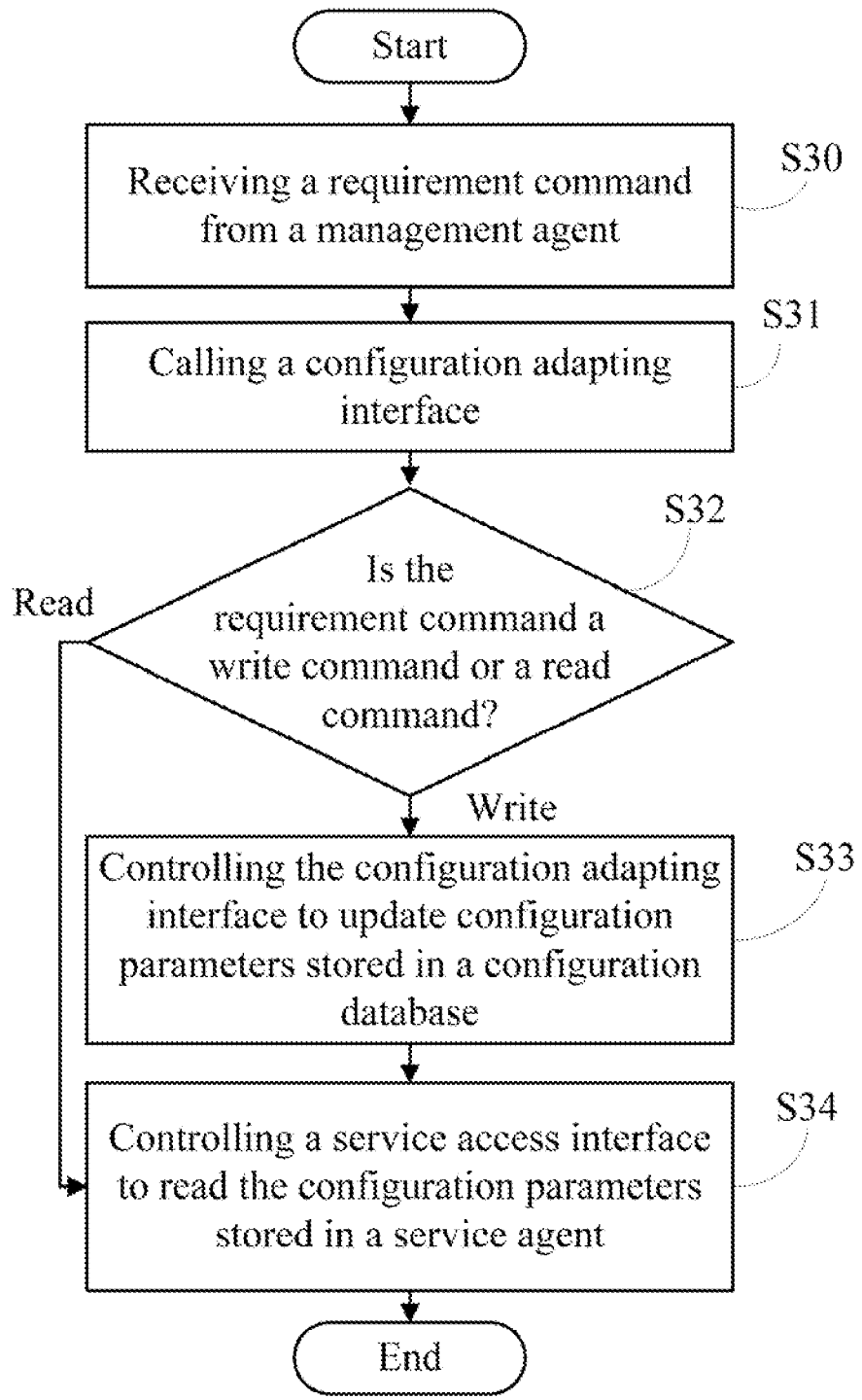
FIG. 3 is a flowchart of one embodiment of a method for updating data of the network device.

FIG. 3 is a flowchart of one embodiment of a method for updating data of the network device 1. Depending on the embodiment, additional blocks may be added, others removed, and the ordering of the blocks may be changed.

In block S30, the receiving module 122 receives a requirement command from the MA 10. The requirement command may be a read command or a write command including data to be written.

In block S31, the calling module 123 calls the configuration adapting interface 121.

In block S32, the detection module 124 detects if the requirement command is the read command or the write command. If the requirement command is the write command, block S33 is implemented. If the requirement command is the read command, block S34 is implemented.

In block S33, the control module 125 controls the configuration adapting interface 121 to update the configuration parameters stored in the CBD 13 using the data included in the write command.

In block S34, the calling module 123 calls the service access interface 120. The control module 125 controls the service access interface 120 to access the configuration parameters stored in the SA 11 and executes the configuration parameters stored in the SA 11.

Figure 4:
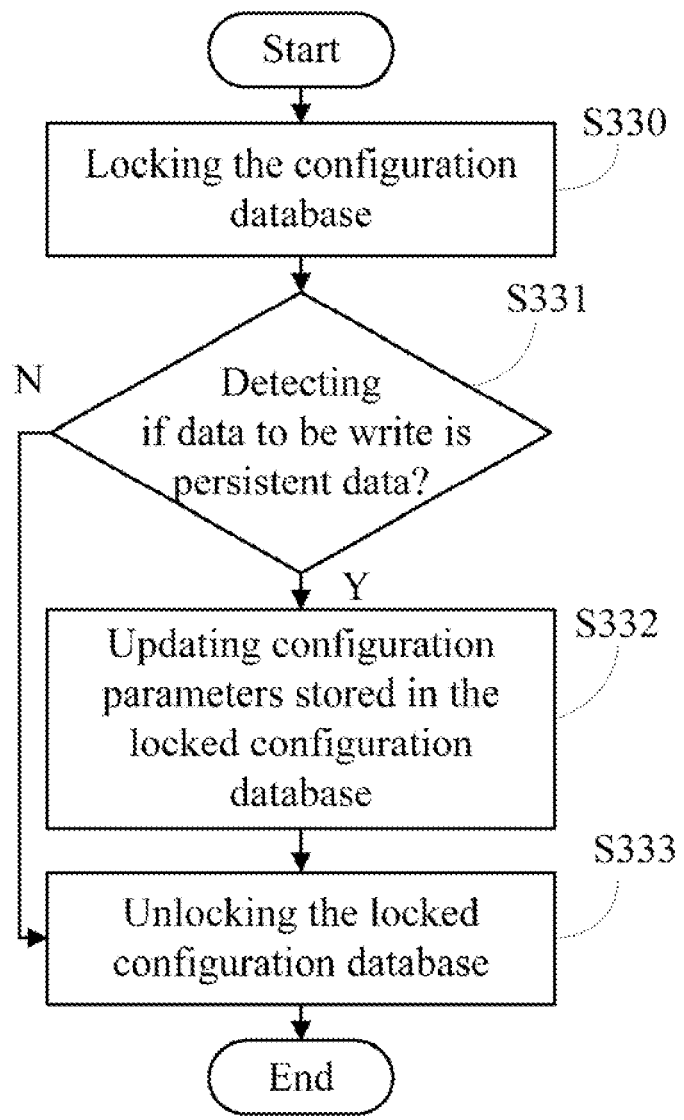
FIG. 4 is a flowchart of one embodiment of detailed description of block S33 of FIG. 3.

FIG. 4 is a flowchart of one embodiment of detailed description of block S33 of FIG. 3. Depending on the embodiment, additional blocks may be added, others removed, and the ordering of the blocks may be changed.

In block S330, the configuration adapting interface 121 locks the CBD 13. If the CBD 13 is locked, the configuration parameters stored in the CBD 13 cannot be accessed by the user.

In block S331, the configuration adapting interface 121 detects if the data included in the write command is persistent data. If the data is persistent data, block S332 is implemented. If the data is non-persistent data, block S333 is implemented.

In block S332, the configuration parameters of the SA 11 stored in the CBD 13 are updated using the data included in the write command.

In block S333, the locked CBD 13 is unlocked.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A network device, comprising:
   a management agent;
   a configuration database;
   a storage system;
   at least one processor; and
   one or more programs being stored in the storage system and executable by the at least one processor, the one or more programs comprising:
   a service access interface;
   a configuration adapting interface;
   a receiving module operable to receive a requirement command from the management agent;
   a control module operable to control the configuration adapting interface to update configuration parameters of a service agent stored in the configuration database according to the requirement command, control the service access interface to access and update the configuration parameters of the service agent stored in the management agent if the requirement command is a write command, wherein the configuration adapting interface is operable to lock the configuration database, update the configuration parameters stored in the configuration database if data contained in the write command is persistent data, and unlock the configuration database after updating; and
   control the service access interface to read the configuration parameters of the service agent stored in the management agent if the requirement command is a read command.

2. The network device as claimed in claim 1, wherein the configuration parameters comprise a name, a data type, and user authority of a service agent of the network device.

3. The network device as claimed in claim 1, wherein the configuration adapting interface is further operable to unlock the configuration database if the data contained in the write command is non-persistent data.

4. A method for updating data of a network device, comprising:
   (a) receiving a requirement command from a management agent;
   (b) detecting if the requirement command is a write command or a read command, block (c) is implemented if the requirement command is the write command, or block (d) is implemented if the requirement command is the read command;
   (c) controlling a configuration adapting interface to update configuration parameters of the management agent stored in a configuration database of the network device using data contained in the write command, comprising: locking the configuration database to prevent applications accessing the configuration database; updating the configuration parameters stored in the configuration database if the data contained in the write command is persistent data, and unlocking the configuration database after updating;
   (d) controlling a service access interface to update the configuration parameters stored in a management agent of the network device if the requirement command is the write command; and
   (e) controlling the service access interface to read the configuration parameters stored in the management agent if the requirement command is the read command.

5. The method as claimed in claim 4, wherein the configuration parameters comprise a name, a data type, and user authority of a service agent of the network device.

6. The method as claimed in claim 4, wherein block (c) further comprises:
   unlocking the configuration database directly if the data contained in the write command is non-persistent data.

7. A non-transitory storage medium storing a set of instructions, the set of instructions capable of being executed by a processor to perform a method for updating parameters of a network device, the method comprising:
   (a) receiving a requirement command from a management agent;
   (b) detecting if the requirement command is a write command or a read command, block (c) is implemented if the requirement command is the write command, or block (d) is implemented if the requirement command is the read command;
   (c) controlling a configuration adapting interface to update configuration parameters of the management agent stored in a configuration database of the network device using data contained in the write command, comprising:

locking the configuration database to prevent applications accessing the configuration database; updating the configuration parameters stored in the configuration database if the data contained in the write command is persistent data, and unlocking the configuration database after updating;

(d) controlling a service access interface to update the configuration parameters stored in a management agent of the network device if the requirement command is the write command; and (e) controlling the service access interface to read the configuration parameters stored in the management agent if the requirement command is the read command.

8. The storage medium as claimed in claim 7, wherein the configuration parameters comprise a name, a data type, and user authority of a service agent of the network device.

9. The storage medium as claimed in claim 7, wherein step (c) further comprises:

unlocking the configuration database directly if the data contained in the write command is non-persistent data.

* * * * *